(12) United States Patent
Anderson et al.

(10) Patent No.: US 11,162,970 B2
(45) Date of Patent: Nov. 2, 2021

(54) ANGLE OF ATTACK SENSOR

(71) Applicant: Rosemount Aerospace Inc., Burnsville, MN (US)

(72) Inventors: Kaleb Anderson, Goodhue, MN (US); Richard Alan Schwartz, Faribault, MN (US); Michael William Madsen, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 31 days.

(21) Appl. No.: 16/443,375

(22) Filed: Jun. 17, 2019

(65) Prior Publication Data

US 2020/0393486 A1 Dec. 17, 2020

(51) Int. Cl.
*G01P 13/00* (2006.01)
*G01P 13/02* (2006.01)

(52) U.S. Cl.
CPC .................. *G01P 13/025* (2013.01)

(58) Field of Classification Search
CPC .................................................. G01P 13/025
See application file for complete search history.

(56) References Cited

U.S. PATENT DOCUMENTS

| | | |
|---|---|---|
| 3,082,622 A | 3/1963 | Andrew |
| 3,208,277 A | 9/1965 | Hays, Jr. |
| 3,400,582 A | 9/1968 | Warner |
| 3,514,997 A | 6/1970 | Gwathmey et al. |
| 3,534,600 A * | 10/1970 | Wagenknecht ........... G01P 5/16 |
| | | 73/180 |
| 3,604,259 A | 9/1971 | Heinsohn et al. |
| 3,665,760 A * | 5/1972 | Pitches .................. B64D 43/02 |
| | | 73/170.09 |
| 3,882,721 A | 5/1975 | Neary et al. |
| 4,230,290 A | 10/1980 | Townsend et al. |
| 4,390,950 A | 6/1983 | Muller |
| (Continued) | | |

FOREIGN PATENT DOCUMENTS

| | | |
|---|---|---|
| CA | 2745138 A1 | 1/2012 |
| CN | 103410682 A | 11/2013 |
| (Continued) | | |

OTHER PUBLICATIONS

Communication pursuant to Article 94(3) EPC for European Patent Application No. 18189480.9, dated Nov. 11, 2019, 4 pages.

(Continued)

*Primary Examiner* — Jamel E Williams
(74) *Attorney, Agent, or Firm* — Kinney & Lange, P.A.

(57) ABSTRACT

An angle of attack sensor includes a housing having an open end and a closed end, a faceplate positioned on the open end of the housing, the faceplate having an opening, a vane assembly extending through the opening of the faceplate, a vane shaft connected to the vane assembly and extending within the housing, the vane shaft having a bore extending through the vane shaft, a bearing surrounding the vane shaft, a vane shaft seal surrounding the vane shaft adjacent the bearing, and a first vent hole extending from an interior surface of the vane shaft to an exterior surface of the vane shaft between the bearing and a first end of the vane shaft seal, the first vent hole being in fluid communication with the bore of the vane shaft.

20 Claims, 5 Drawing Sheets

(56) References Cited

U.S. PATENT DOCUMENTS

| | | | |
|---|---|---|---|
| 4,458,137 A | 7/1984 | Kirkpatrick | |
| 4,468,961 A | 9/1984 | Berg | |
| 4,901,566 A * | 2/1990 | Boetsch | G01P 13/025 |
| | | | 73/180 |
| 5,025,661 A | 6/1991 | Mccormack | |
| 5,062,869 A | 11/1991 | Hagen | |
| 5,115,237 A | 5/1992 | Greene | |
| 5,322,246 A | 6/1994 | Henne et al. | |
| 5,438,865 A * | 8/1995 | Greene | G01P 13/025 |
| | | | 73/170.05 |
| 5,442,958 A | 8/1995 | Hagen | |
| 5,466,067 A | 11/1995 | Hagen et al. | |
| 5,628,565 A | 5/1997 | Hagen et al. | |
| 6,070,475 A | 6/2000 | Muehlhauser et al. | |
| 6,076,963 A * | 6/2000 | Menzies | G01K 13/02 |
| | | | 374/138 |
| 6,510,740 B1 | 1/2003 | Behm et al. | |
| 6,561,006 B1 | 5/2003 | Roberge et al. | |
| 6,672,152 B2 | 1/2004 | Rouse et al. | |
| 6,845,658 B2 | 1/2005 | Roberge et al. | |
| 6,918,294 B1 | 7/2005 | Roberge | |
| 6,941,805 B2 | 9/2005 | Seidel et al. | |
| 7,186,951 B2 * | 3/2007 | Zippold | G01F 1/46 |
| | | | 219/201 |
| 7,401,507 B2 * | 7/2008 | Collot | B64D 43/02 |
| | | | 73/170.01 |
| 7,597,018 B2 | 10/2009 | Braun et al. | |
| 7,748,268 B2 | 7/2010 | Lull et al. | |
| 8,397,565 B1 | 3/2013 | Dillon et al. | |
| 9,752,945 B2 | 9/2017 | Hedtke et al. | |
| 10,179,654 B2 | 1/2019 | Anderson et al. | |
| 10,197,588 B2 | 2/2019 | Wong et al. | |
| 10,393,766 B2 * | 8/2019 | Alcaya | G01F 1/6842 |
| 10,730,637 B2 * | 8/2020 | Krueger | G01P 5/165 |
| 2003/0115948 A1 | 6/2003 | Rouse et al. | |
| 2004/0188945 A1 * | 9/2004 | Poincet | F16J 15/40 |
| | | | 277/408 |
| 2004/0261518 A1 | 12/2004 | Seidel et al. | |
| 2010/0116806 A1 | 5/2010 | Hollingsworth et al. | |
| 2011/0208375 A1 | 8/2011 | Spoerry et al. | |
| 2015/0082878 A1 | 3/2015 | Bigand | |
| 2015/0110149 A1 * | 4/2015 | Begin-Drolet | G08B 19/02 |
| | | | 374/16 |
| 2015/0122797 A1 | 5/2015 | Eggers | |
| 2015/0344137 A1 | 12/2015 | Bartz et al. | |
| 2016/0033356 A1 * | 2/2016 | DeAngelo | G01M 3/40 |
| | | | 324/694 |
| 2016/0114883 A1 | 4/2016 | Guerry et al. | |
| 2016/0356175 A1 | 12/2016 | Waddington | |
| 2017/0199218 A1 * | 7/2017 | Benning | G01P 21/00 |
| 2017/0273144 A1 | 9/2017 | Caillot et al. | |
| 2018/0079525 A1 | 3/2018 | Krueger et al. | |
| 2018/0136249 A1 | 5/2018 | Krueger et al. | |
| 2019/0056424 A1 | 2/2019 | Alcaya et al. | |
| 2019/0056425 A1 * | 2/2019 | Reid | B64D 43/00 |
| 2019/0100327 A1 | 4/2019 | Krueger et al. | |
| 2019/0210734 A1 | 7/2019 | Whalen | |
| 2019/0242924 A1 | 8/2019 | Lang et al. | |
| 2019/0301949 A1 | 10/2019 | Gordon et al. | |
| 2019/0346478 A1 | 11/2019 | Reid et al. | |
| 2019/0346479 A1 | 11/2019 | Reid | |
| 2020/0309630 A1 | 10/2020 | Gilkison et al. | |

FOREIGN PATENT DOCUMENTS

| | | |
|---|---|---|
| CN | 104034301 A | 9/2014 |
| CN | 105142246 A | 12/2015 |
| CN | 106628206 A | 5/2017 |
| CN | 107687350 A | 2/2018 |
| CN | 107843249 A | 3/2018 |
| DE | 102008007469 A1 | 8/2009 |
| DE | 202014105763 U1 | 2/2016 |
| EP | 1319863 A1 | 6/2003 |
| EP | 0932831 B1 | 2/2004 |
| EP | 1844863 A1 | 10/2007 |
| EP | 1980860 A2 | 10/2008 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3413025 A1 | 12/2018 |
| EP | 3567376 A1 | 11/2019 |
| GB | 2039676 A | 8/1980 |
| SE | 541696 C2 | 11/2019 |
| WO | 9010492 A1 | 9/1990 |
| WO | 03087847 A1 | 10/2003 |

OTHER PUBLICATIONS

Extended European Search Report for European Patent Application No. 20159881.0, dated Jun. 15, 2020, 5 pages.

Extended European Search Report for European Patent No. 19216057.0, dated Jul. 8, 2020, 10 pages.

Extended European Search Report for European Patent Application No. 18189469.2, dated Jan. 21, 2019, 7 pages.

Extended European Search Report for European Patent Application No. 18189477.5, dated Jan. 21, 2019, 10 pages.

Extended European Search Report for European Patent Application No. 18189480.9, dated Mar. 6, 2019, 10 pages.

Extended European Search Report for European Patent Application No. 20213883.0, dated Apr. 23, 2021, 9 pages.

Extended European Search Report dated Jul. 10, 2020, issued during the prosecution of European Patent Application No. EP 19213954.1.

Extended European Search Report for European Patent Application No. 19173355.9, dated Sep. 11, 2019, 12 pages.

Extended European Search Report for European Patent Application No. 19173361.7, dated Sep. 11, 2019, 11 pages.

Extended European Search Report for European Patent Application No. 18215700.8 dated May 20, 2019, 9 pages.

EP Communcation pursuant to article 94(3) EPC for App 18215700.8 dated Jul. 8, 2020.

\* cited by examiner

ANGLE OF ATTACK SENSOR

BACKGROUND

The present disclosure relates to sensors, and in particular, to angle of attack sensors.

Angle of attack sensors with rotatable vanes are installed on sides of aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Moisture and other contaminants can enter and move through the angle of attack sensor along with the oncoming airflow. Freezing water and pollutants can impede or interfere with the free rotation and aerodynamic characteristics of the vane, which can cause the angle of attack sensor to generate less accurate measurements.

SUMMARY

An angle of attack sensor includes a housing having an open end and a closed end, a faceplate positioned on the open end of the housing, the faceplate having an opening, a vane assembly extending through the opening of the faceplate, a vane shaft connected to the vane assembly and extending within the housing, the vane shaft having a bore extending through the vane shaft, a bearing surrounding the vane shaft, a vane shaft seal surrounding the vane shaft adjacent the bearing, and a first vent hole extending from an interior surface of the vane shaft to an exterior surface of the vane shaft between the bearing and a first end of the vane shaft seal, the first vent hole being in fluid communication with the bore of the vane shaft.

A vane shaft for an angle of attack sensor includes a body portion, a top portion connected to an end of the body portion, the top portion being configured to connect to a vane assembly, a bore extending through the body portion and the top portion, and a first vent hole extending through the body portion from the bore to an exterior surface of the vane shaft.

A method of directing airflow through an angle of attack sensor includes directing airflow through a bore of a vane shaft, directing airflow through a vent hole of the vane shaft, the vent hole extending from the bore of the vane shaft to an exterior surface of the vane shaft, and directing airflow past a vane shaft seal positioned around the vane shaft. The vent hole is between an end of the vane shaft seal and a bearing positioned around the vane shaft.

DETAILED DESCRIPTION

In general, the present disclosure describes an angle of attack sensor that has a vent hole in the vane shaft beneath a lip of the vane shaft seal and above the bearing to direct venting airflow through a center bore of the vane shaft and past the vane shaft seal, resulting in a sealed breathing path where the venting airflow bypasses the bearing. Consequently, the bearing is not subjected to contaminants and water in the airflow, preventing the bearing from freezing and increasing the life of the angle of attack sensor.

Figure 1:
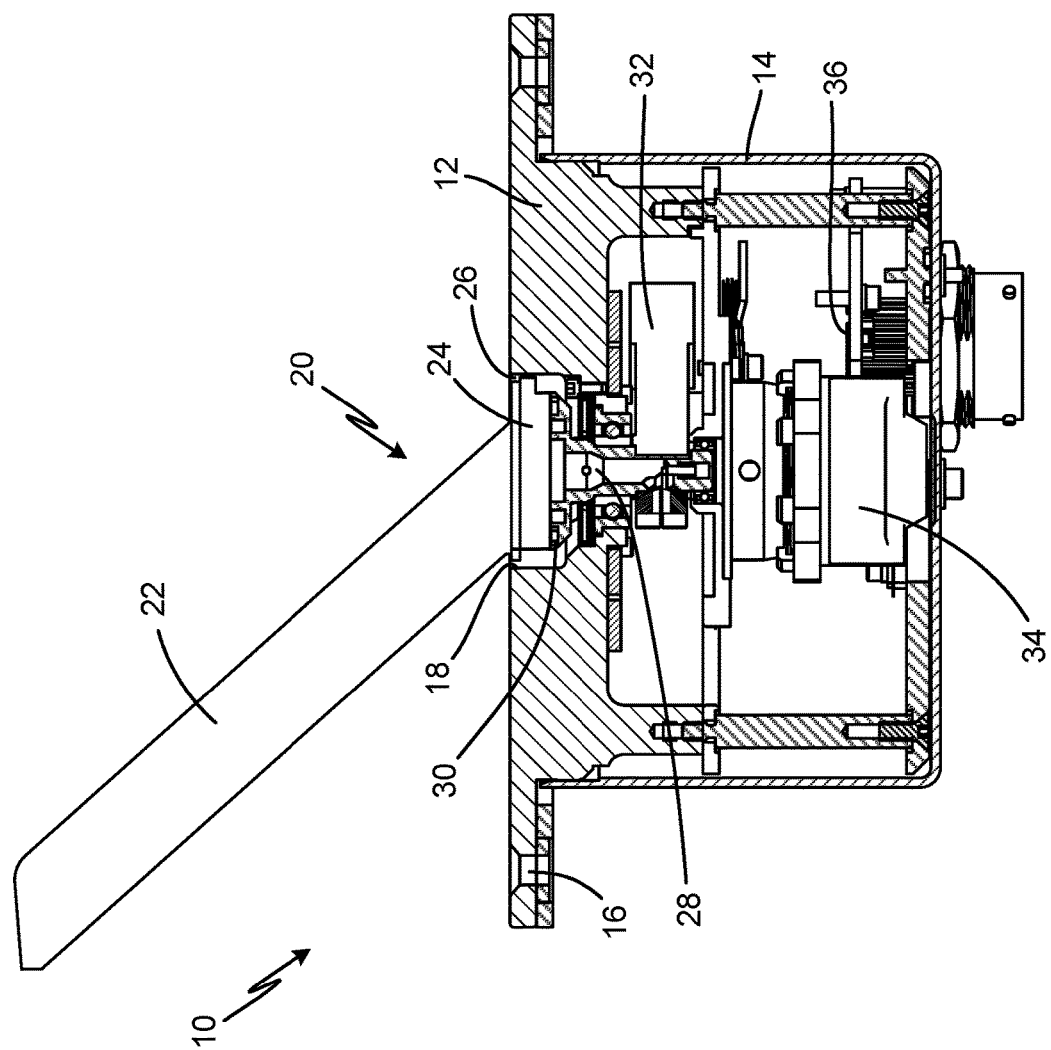
FIG. 1 is a partial cross-sectional view of an angle of attack sensor.

FIG. 1 is a partial cross-sectional view of angle of attack sensor 10. Angle of attack sensor 10 includes faceplate 12, housing 14, mounting holes 16, opening 18, vane assembly 20 (including vane 22 and vane base 24), annular gap 26, vane shaft 28, o-ring 30, counterweight 32, resolver 34, and electronics 36. Vane assembly 20, counterweight 32, and resolver 34 are not shown in cross-section in FIG. 1.

Faceplate 12 is a faceplate of angle of attack sensor 10. Faceplate 12 is positioned on and connected to housing 14. Housing 14 is cylindrical with an annular sidewall between an open first end and a closed second end. Faceplate 12 is positioned on the open first end of housing 14 such that a portion of faceplate 12 extends within the open first end of housing 14. Faceplate 12 is sealed to housing 14. Mounting holes 16 extend through faceplate 12 from a first surface of faceplate 12 to a second surface of faceplate 12. Mounting holes 16 are positioned near a periphery of faceplate 12. Opening 18 is a circular opening at a center of faceplate 12. Vane assembly 20 extends through opening 18 of faceplate 12. Vane assembly 20 has vane 22 connected to vane base 24 at a first end of vane 22. Vane base 24 is positioned in opening 18. Annular gap 26 is adjacent vane base 24. Annular gap 26 is a space that surrounds vane base 24. As such, annular gap 26 is between vane base 24 and faceplate 12. Consequently, annular gap 26 acts as a representation of the boundary between parts that rotate, such as vane 22 and vane base 24, and parts that do not rotate, such as faceplate 12. A first end of rotatable vane shaft 28 is connected to vane base 24. Vane shaft 28 extends through faceplate 12 into and within housing 14. O-ring 30 is positioned in a groove in the first end of vane shaft 28 such that o-ring 30 is between vane base 24 and the first end of vane shaft 28. Counterweight 32 is mounted on the second end of vane shaft 28. As such, vane base 24, vane shaft 28, and counterweight 32 are configured to rotate together. Resolver 34 is connected to vane shaft 28 via a resolver shaft. Resolver 34 is positioned within housing 14. Electronics 36 are positioned adjacent resolver 34 and connected to resolver 34 within housing 14.

Angle of attack sensors 10 are installed on the exterior of an aircraft and mounted to the aircraft via fasteners, such as screws or bolts, through mounting holes 16 on faceplate 12. As a result, faceplate 12 is in line with the skin of the aircraft and housing 14 extends within an interior of the aircraft. Vane 22 extends outside an exterior of aircraft and is exposed to oncoming airflow, causing vane 22 and vane base 24 of vane assembly 20 to rotate with respect to faceplate 12 via a series of bearings within angle of attack sensor 10. Vane 22 rotates based on the angle the aircraft is flying at relative to the oncoming airflow. More specifically, vane 22 rotates to be parallel with oncoming airflow. Vane 22 causes vane base 24 to rotate, which causes rotation of vane shaft 28. Rotation of vane shaft 28 is sensed by resolver 34 and used to measure the local angle of attack, or angle of the airflow relative to the fixed aircraft structure. O-ring 30 impedes water ingress between vane base 24 and vane shaft 28. Counterweight 32 is mounted on vane shaft 28 to counterbalance vane 22. Electronics 36 power electronic components of angle of attack sensor 10, such as resolver 34.

Figure 2A:
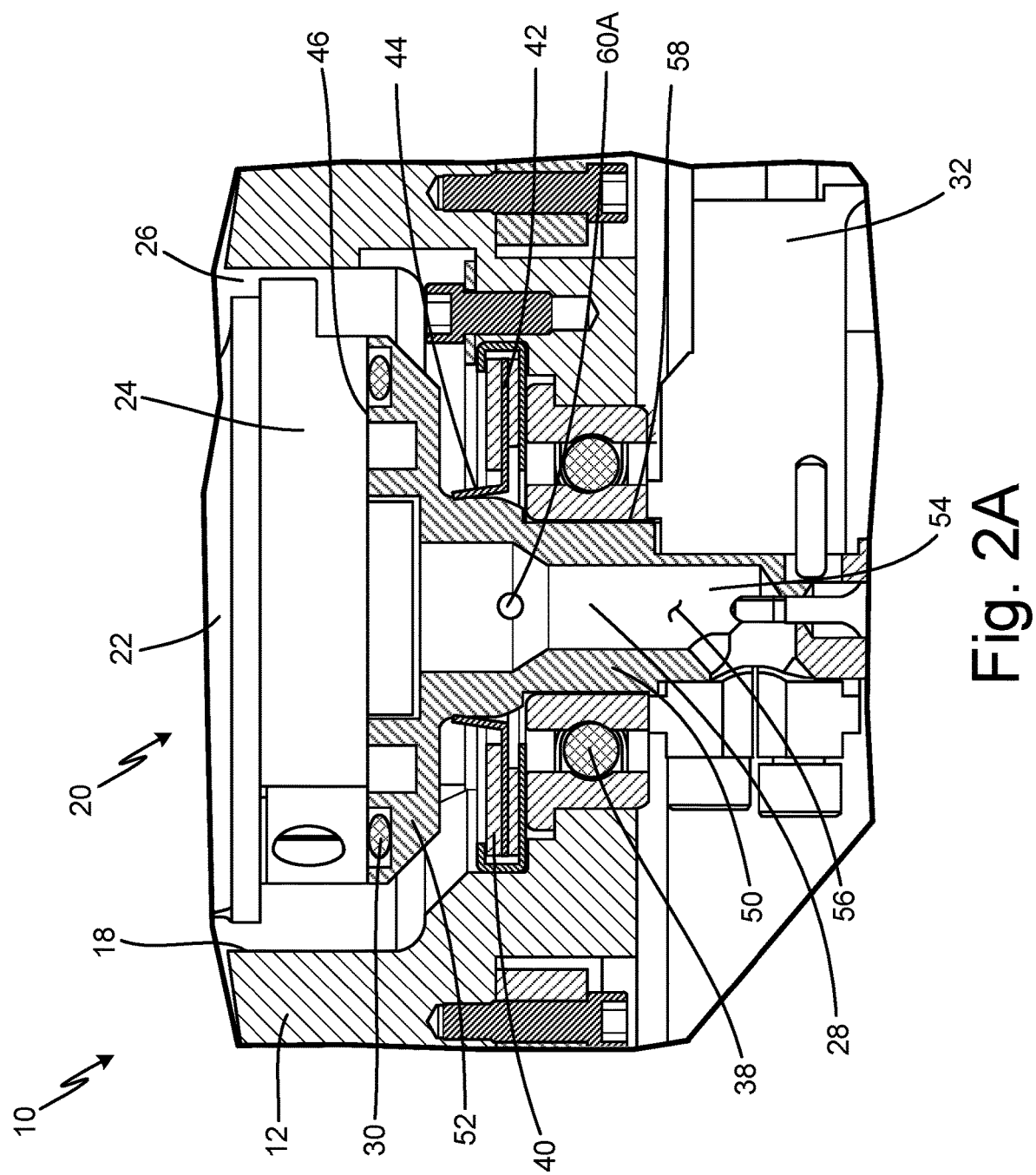
FIG. 2A is an enlarged partial cross-sectional view of a portion of the angle of attack sensor.
Figure 2B:
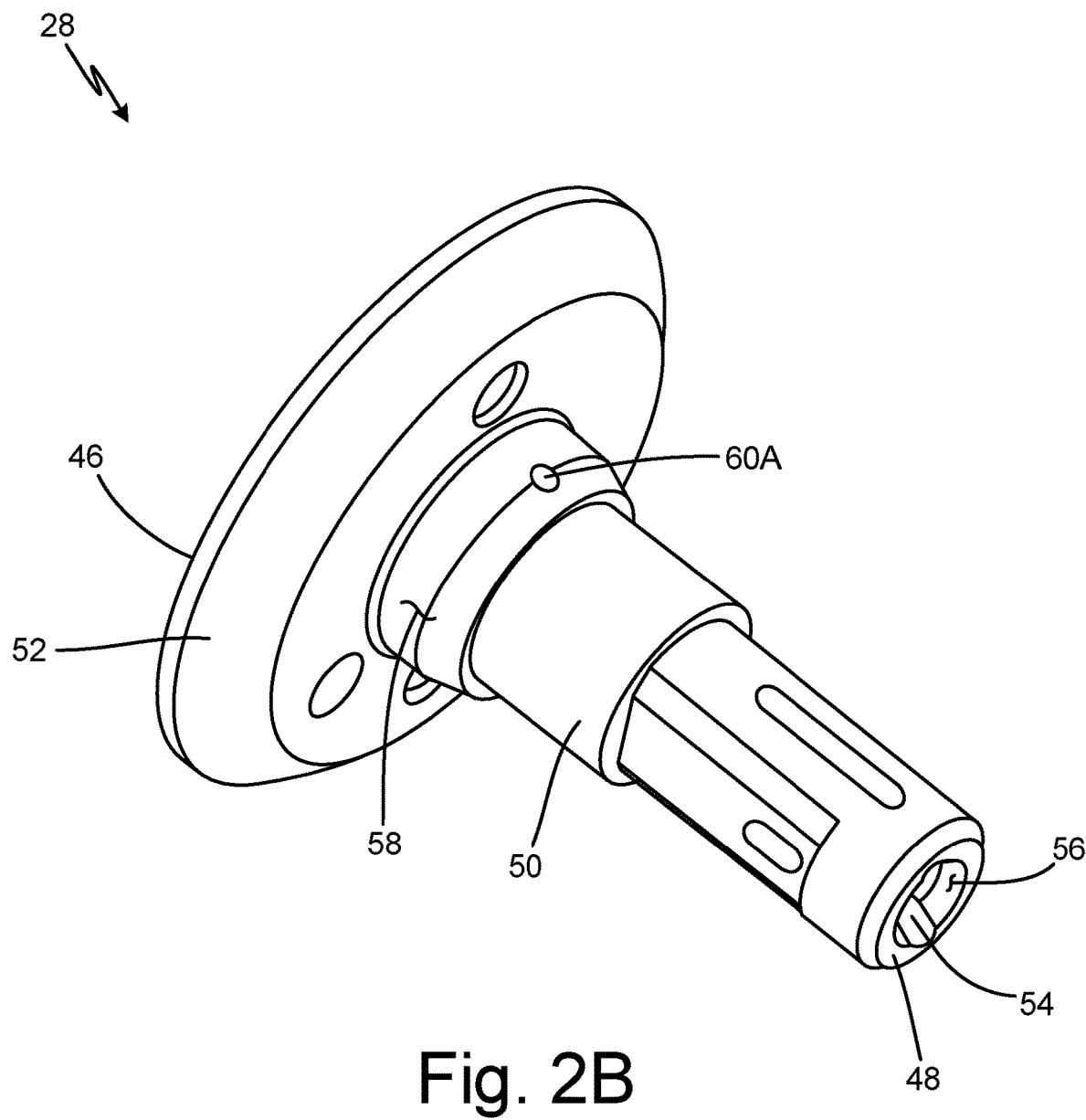
FIG. 2B is an isometric view of the vane shaft.
Figure 2C:
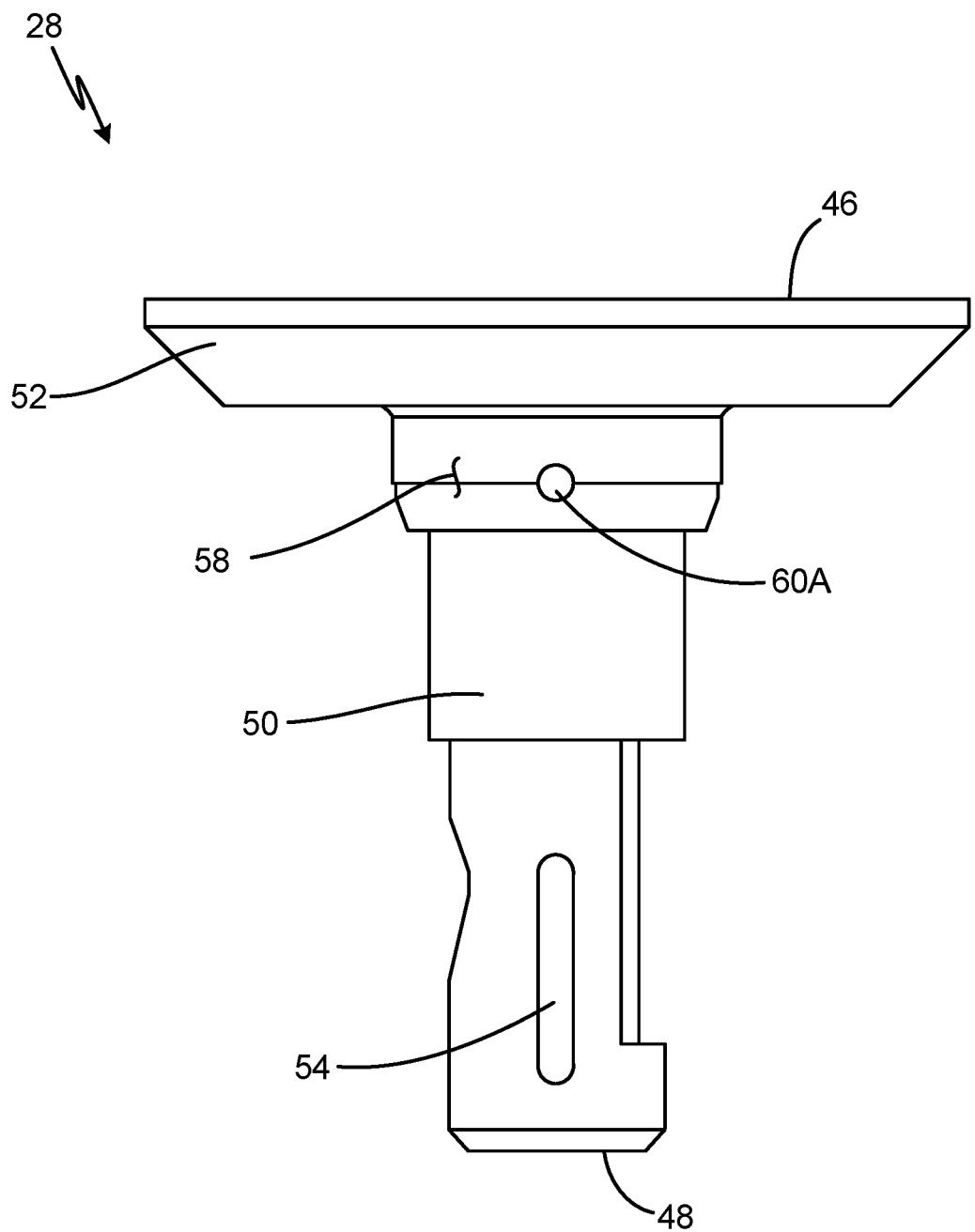
FIG. 2C is a side view of the vane shaft.
Figure 2D:
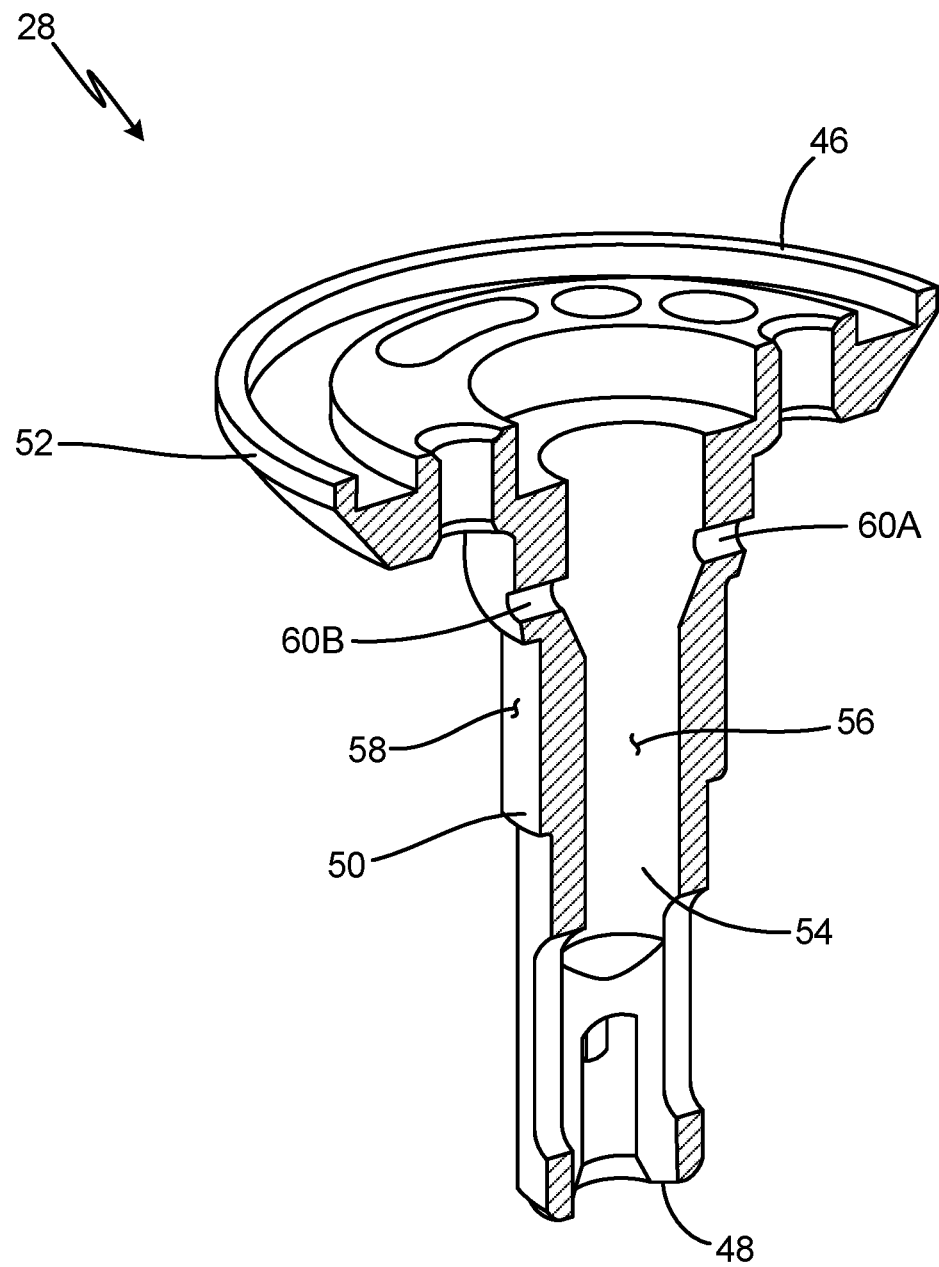
FIG. 2D is a cross-sectional isometric view of the vane shaft.

FIG. 2A is an enlarged partial cross-sectional view of a portion of angle of attack sensor 10. FIG. 2B is an isometric view of vane shaft 28. FIG. 2C is a side view of vane shaft 28. FIG. 2D is a cross-sectional isometric view of vane shaft 28. FIGS. 2A-2D will be discussed together. Angle of attack sensor 10 includes faceplate 12, opening 18, vane assembly 20 (including vane 22 and vane base 24), annular gap 26, vane shaft 28, o-ring 30, counterweight 32, bearing 38, and vane shaft seal 40 (which includes sealing element 42 having lip 44). Vane shaft 28 includes first end 46, second end 48, body portion 50, top portion 52, bore 54, interior surface 56, exterior surface 58, and vent holes 60A and 60B (shown in FIG. 2D).

Angle of attack sensor 10 has the same structure and function as angle of attack sensor 10 described in reference to FIG. 1. Bearing 38 is positioned around vane shaft 28 such that bearing 38 surrounds vane shaft 28. Vane shaft seal 40 is positioned around vane shaft 28 above bearing 38 such that vane shaft seal 40 surrounds vane shaft 28. A bottom, or end, of vane shaft seal 40 contacts a top, or end, of bearing 38. As such, vane shaft seal 40 is adjacent bearing 38 and between bearing 38 and vane assembly 20. Vane shaft seal 40 is an annular seal. Vane shaft seal 40 has annular sealing element 42 with annular lip 44 in contact with vane shaft 28. A top, or end, of lip 44 makes up a top, or end, of vane shaft seal 40. Vane shaft seal 40 is a light seal. As such, lip 44 of sealing element 42 of vane shaft seal 40 contacts vane shaft 28 and seals against vane shaft 28, but may also move away from vane shaft 28 due to airflow within angle of attack sensor 10.

Vane shaft 28 has first end 46, which is connected to vane base 24, and second end 48, which is within housing 14 and connected to counterweight 32. Vane shaft 28 has body portion 50 and top portion 52 connected to body portion 50. A first end of top portion 52 makes up first end 46 of vane shaft 28, a second end of top portion 52 is connected to a first end of body portion 50, and a second end of body portion 50 makes up second end 48 of vane shaft 28. Body portion 50 is narrower than top portion 52. Vane shaft seal 40 contacts body portion 50 of vane shaft 28. Top portion 52 is connected to vane base 24. Bore 54 is a passageway that extends through vane shaft 28 from first end 46 to second end 48 such that bore 54 extends through body portion 50 and top portion 52 of vane shaft 28. Bore 54 is defined by interior surface 56. Interior surface 56 is a surface at the inside, and primarily at the center, of vane shaft 28. Exterior surface 58 is a surface at the outside of vane shaft 28.

Vent hole 60A is at a first side of vane shaft 28 and vent hole 60B is at a second side of vane shaft 28. In this embodiment, vent hole 60A is 180 degrees from vent hole 60B. In alternate embodiments, vent holes 60A and 60B may be any distance apart. Vent holes 60A and 60B extend through body portion 50 of vane shaft 28 from interior surface 56 to exterior surface 58. As such, vent holes 60A and 60B are in fluid communication with bore 54 of vane shaft 28 and extend from bore 54 to exterior surface 58. Vent holes 60A and 60B extend through body portion 50 of vane shaft 28 above bearing 38 and below lip 44 of sealing element 42 of vane shaft seal 40, or adjacent top portion 52, so that vent holes 60A and 60B are between bearing 38 and a top, or end, of vane shaft seal 40. Vent holes 60A and 60B do not contact vane shaft seal 40. In alternate embodiments, angle of attack sensor 10 may include one or more than two vent holes 60. Body portion 50 may have other passageways extending from exterior surface 58 into bore 54.

Bearing 38 supports rotation of vane shaft 28 within bearing 38. Vane shaft seal 40 acts as a retainer for bearing 38, keeping bearing 38 from backing out of angle of attack sensor 10. Lip 44 of sealing element 42 of vane shaft seal 40 is positioned against vane shaft 28 to provide sealing at vane shaft 28. Vane shaft seal 40 is a light seal so as to not restrict movement of vane shaft 28, which would interfere with the functionality of angle of attack sensor 10. Vane shaft seal 40 allows free rotation of vane assembly 20. Because vane shaft seal 40 is a light seal, lip 44 will move away from vane shaft 28 to allow airflow to move past vane shaft seal 40. As such, vane shaft seal 40 keeps most moisture from moving past vane shaft seal 40 while allowing airflow to move past vane shaft seal 40.

Airflow moves in and out of angle of attack sensor 10 due to changes in pressure during ascent and descent of the aircraft. Airflow will enter angle of attack sensor 10 during descent and will evacuate angle of attack sensor 10 during ascent. As such, during descent of the aircraft, airflow enters angle of attack sensor 10 at annular gap 26. Airflow travels through annular gap 26, past vane shaft seal 40 between lip 44 of sealing element 42 and exterior surface 58 of vane shaft seal 40 to enter vent holes 60A and 60B, through vent holes 60A and 60B to enter bore 54, and down through bore 54 of vane shaft 28. During ascent of the aircraft, airflow travels up through bore 54 of vane shaft 28 to enter vent holes 60A and 60B, through vent holes 60A and 60B to exterior surface 58, and past vane shaft seal 40 between lip 44 and exterior surface 58 of vane shaft 28, and exits angle of attack sensor 10 through annular gap 26. Thus, airflow is vented within angle of attack sensor 10 through vane shaft 28 and vane shaft seal 40, bypassing bearing 28. As airflow moves through bore 54 and vent holes 60A and 60B of vane shaft 28 and exits angle of attack sensor 10, water and contaminants are also expelled from angle of attack sensor 10 through bore 54 and vent holes 60A and 60B along with the airflow.

Traditionally, a faceplate has vent holes that are exposed to oncoming airflow and provide a direct path from the oncoming airflow into an interior chamber of the angle of attack sensor to vent airflow into and out of the interior chamber of the angle of attack sensor. As a result, water and contaminants could easily enter the angle of attack sensor. Because angle of attack sensor 10 has vent holes 60A and 60B in vane shaft 28, faceplate 12 does not have vent holes that are directly exposed to oncoming airflow and water. Vent holes 60A and 60B are protected from direct water spray by being below a top of vane shaft seal 40. Thus, water is less likely to move into an interior chamber of housing 12 and damage electronics 36.

Additionally, because vane shaft 28 has vent holes 60A and 60B positioned between bearing 38 and a top of vane shaft seal 40, airflow moves into vent holes 60A and 60B and goes around bearing 30. Airflow in angle of attack sensor 10 vents through vane shaft 28 and does not flow through bearing 38, preventing water and contaminants in the airflow from traveling through bearing 38. As a result, contaminants will not build up over time on bearing 38 and interfere with the ability of vane shaft 28 to freely rotate, which affects the performance of angle of attack sensor 10. Additionally, the amount of water traveling through bearing 38 is reduced, which reduces the likelihood of vane shaft 28 freezing and being unable to freely rotate. As a result, angle of attack sensor 10 has greater reliability.

Further, because angle of attack sensor 10 has more than one vent hole 60A and 60B in vane shaft 28, venting through vane shaft 28 can still occur even if a single vent hole 60A and 60B becomes plugged.

Discussion of Possible Embodiments

The following are non-exclusive descriptions of possible embodiments of the present invention.

An angle of attack sensor comprising: a housing having an open end and a closed end; a faceplate positioned on the open end of the housing, the faceplate having an opening; a vane assembly extending through the opening of the faceplate; a vane shaft connected to the vane assembly and extending within the housing, the vane shaft having a bore extending through the vane shaft; a bearing surrounding the vane shaft; a vane shaft seal surrounding the vane shaft adjacent the bearing; and a first vent hole extending from an interior surface of the vane shaft to an exterior surface of the vane shaft between the bearing and a first end of the vane shaft seal, the first vent hole being in fluid communication with the bore of the vane shaft.

The angle of attack sensor of the preceding paragraph can optionally include, additionally and/or alternatively, any one or more of the following features, configurations and/or additional components:

The first vent hole directs airflow through the bore of the vane shaft to the first vent hole, through the first vent hole to the exterior surface of the vane shaft, along the exterior surface of the vane shaft past the vane shaft seal.

Air flows past the vane shaft seal to the first vent hole, through the first vent hole to the bore of the vane shaft, and through the bore of the vane shaft.

A second vent hole extending from the interior surface of the vane shaft to the exterior surface of the vane shaft between the bearing and the first end of the vane shaft seal, the second vent hole being in fluid communication with the bore of the vane shaft.

The first vent hole is 180 degrees from the second vent hole.

The vane shaft seal includes a sealing element having a lip that contacts the vane shaft, an end of the lip making up the first end of the vane shaft seal.

The lip of the vane shaft seal is configured to move away from the vane shaft due to airflow within the angle of attack sensor.

The bore extends through the vane shaft from a first end of the vane shaft to a second end of the vane shaft.

A second end of the vane shaft seal contacts an end of the bearing.

The vane shaft seal is an annular Teflon seal.

The vane shaft seal is configured to allow free rotation of the vane assembly.

A counterweight connected to the vane shaft; and a resolver connected to the vane shaft.

The vane shaft comprises a body portion and a top portion connected to the body portion, the top portion being connected to a vane base of the vane assembly, wherein the vane shaft seal contacts the body portion and the first vent hole extends through the body portion.

A vane shaft for an angle of attack sensor, the vane shaft including: a body portion; a top portion connected to an end of the body portion, the top portion being configured to connect to a vane assembly; a bore extending through the body portion and the top portion; and a first vent hole extending through the body portion from the bore to an exterior surface of the vane shaft adjacent to the top portion.

The vane shaft of the preceding paragraph can optionally include, additionally and/or alternatively, any one or more of the following features, configurations and/or additional components:

A second vent hole extending through the body portion from the bore to the exterior surface of the vane shaft.

The first vent hole is 180 degrees from the second vent hole.

A bearing surrounding the vane shaft; and a vane shaft seal surrounding the vane shaft; wherein the first vent hole is configured to extend through the body portion such that the vent hole is between the bearing and an end of the vane shaft seal of the angle of attack sensor.

A method of directing airflow through an angle of attack sensor, the method including: directing airflow through a bore of a vane shaft; directing airflow through a vent hole of the vane shaft, the vent hole extending from the bore of the vane shaft to an exterior surface of the vane shaft; and directing airflow past a vane shaft seal positioned around the vane shaft; wherein the vent hole is between an end of the vane shaft seal and a bearing positioned around the vane shaft.

The method of the preceding paragraph can optionally include, additionally and/or alternatively, any one or more of the following features, configurations and/or additional components:

Directing airflow past a vane shaft seal includes directing airflow between a lip of a sealing element of the vane shaft seal and an exterior surface of the vane shaft.

Directing airflow through an annular gap between a vane assembly of the angle of attack sensor and a faceplate of the angle of attack sensor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
   a housing having an open end and a closed end;
   a faceplate positioned on the open end of the housing, the faceplate having an opening;
   a vane assembly extending through the opening of the faceplate;
   a vane shaft connected to the vane assembly and extending within the housing, the vane shaft having a bore extending through the vane shaft;
   a bearing surrounding the vane shaft;
   a vane shaft seal surrounding the vane shaft adjacent the bearing; and
   a first vent hole extending from an interior surface of the vane shaft to an exterior surface of the vane shaft between the bearing and a first end of the vane shaft seal, the first vent hole being in fluid communication with the bore of the vane shaft.

2. The angle of attack sensor of claim 1, wherein the first vent hole directs airflow through the bore of the vane shaft to the first vent hole, through the first vent hole to the exterior surface of the vane shaft, along the exterior surface of the vane shaft past the vane shaft seal.

3. The angle of attack sensor of claim 1, wherein air flows past the vane shaft seal to the first vent hole, through the first vent hole to the bore of the vane shaft, and through the bore of the vane shaft.

4. The angle of attack sensor of claim 1, further comprising a second vent hole extending from the interior surface of the vane shaft to the exterior surface of the vane shaft between the bearing and the first end of the vane shaft seal, the second vent hole being in fluid communication with the bore of the vane shaft.

5. The angle of attack sensor of claim 4, wherein the first vent hole is 180 degrees from the second vent hole.

6. The angle of attack sensor of claim 1, wherein the vane shaft seal includes a sealing element having a lip that contacts the vane shaft, an end of the lip making up the first end of the vane shaft seal.

7. The angle of attack sensor of claim 6, wherein the lip of the vane shaft seal is configured to move away from the vane shaft due to airflow within the angle of attack sensor.

8. The angle of attack sensor of claim 1, wherein the bore extends through the vane shaft from a first end of the vane shaft to a second end of the vane shaft.

9. The angle of attack sensor of claim 1, wherein a second end of the vane shaft seal contacts an end of the bearing.

10. The angle of attack sensor of claim 1, wherein the vane shaft seal is an annular Teflon seal.

11. The angle of attack sensor of claim 1, wherein the vane shaft seal is configured to allow free rotation of the vane assembly.

12. The angle of attack sensor of claim 1, further comprising:
   a counterweight connected to the vane shaft; and
   a resolver connected to the vane shaft.

13. The angle of attack sensor of claim 1, wherein the vane shaft comprises a body portion and a top portion connected to the body portion, the top portion being connected to a vane base of the vane assembly, wherein the vane shaft seal contacts the body portion and the first vent hole extends through the body portion.

14. A vane shaft for an angle of attack sensor, the vane shaft comprising:
   a body portion;
   a top portion connected to an end of the body portion, the top portion being configured to connect to a vane assembly, wherein the body portion is narrower than the top portion;
   a bore extending through the body portion and the top portion; and
   a first vent hole extending through the body portion from the bore to an exterior surface of the vane shaft adjacent to the top portion such that the first vent hole is closer to the top portion than an opposite end of the body portion.

15. The vane shaft of claim 14, further comprising a second vent hole extending through the body portion from the bore to the exterior surface of the vane shaft.

16. The vane shaft of claim 15, wherein the first vent hole is 180 degrees from the second vent hole.

17. An angle of attack sensor comprising:
   a vane shaft comprising:
      a body portion;
      a top portion connected to an end of the body portion, the top portion being configured to connect to a vane assembly;
      a bore extending through the body portion and the top portion; and
      a first vent hole extending through the body portion from the bore to an exterior surface of the vane shaft adjacent to the top portion;
   a bearing surrounding the vane shaft; and
   a vane shaft seal surrounding the vane shaft;
   wherein the first vent hole is configured to extend through the body portion such that the vent hole is between the bearing and an end of the vane shaft seal of the angle of attack sensor.

18. A method of directing airflow through an angle of attack sensor, the method including:
   directing airflow through a bore of a vane shaft;
   directing airflow through a vent hole of the vane shaft, the vent hole extending from the bore of the vane shaft to an exterior surface of the vane shaft; and
   directing airflow past a vane shaft seal positioned around the vane shaft;
   wherein the vent hole is between an end of the vane shaft seal and a bearing positioned around the vane shaft.

19. The method of claim 18, wherein directing airflow past a vane shaft seal includes directing airflow between a lip of a sealing element of the vane shaft seal and an exterior surface of the vane shaft.

20. The method of claim 18, further including directing airflow through an annular gap between a vane assembly of the angle of attack sensor and a faceplate of the angle of attack sensor.

* * * * *